US008375595B2

(12) United States Patent
Murray et al.

(10) Patent No.: US 8,375,595 B2
(45) Date of Patent: Feb. 19, 2013

(54) TAPE RULE WITH REMOVABLE MAGNET ASSEMBLY

(75) Inventors: John C. Murray, Canton, CT (US); John Delneo, Middletown, CT (US); Albert Sanchez, Naugatuck, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 0 days.

(21) Appl. No.: 13/206,623

(22) Filed: Aug. 10, 2011

(65) Prior Publication Data

US 2012/0159799 A1    Jun. 28, 2012

Related U.S. Application Data

(60) Provisional application No. 61/426,246, filed on Dec. 22, 2010.

(51) Int. Cl.
*G01B 3/10* (2006.01)
(52) U.S. Cl. ............................. 33/758; 33/768; 33/770
(58) Field of Classification Search ........... 33/758–760, 33/768, 770
See application file for complete search history.

(56) References Cited

U.S. PATENT DOCUMENTS

| | | |
|---|---|---|
| 2,663,941 A | 12/1953 | Dart |
| 3,036,791 A | 5/1962 | Siggelkow |
| 3,100,937 A | 8/1963 | Burch |
| 4,580,347 A | 4/1986 | McKnight |
| 4,827,622 A | 5/1989 | Makar |
| 4,924,597 A | 5/1990 | Tursi |
| 5,421,100 A | 6/1995 | Leore |
| 6,070,338 A | 6/2000 | Garity |
| 6,073,983 A | 6/2000 | Schroeder |
| 6,115,931 A | 9/2000 | Arcand |
| 6,370,790 B1 | 4/2002 | Stenger |
| 6,442,863 B1 | 9/2002 | Poineau et al. |
| 6,470,589 B2 | 10/2002 | Simmons |
| 6,511,112 B2 | 1/2003 | Schroeder |

(Continued)

FOREIGN PATENT DOCUMENTS

| | | |
|---|---|---|
| DE | 3141635 | 4/1983 |
| DE | 29716231 U1 | 1/1999 |

(Continued)

OTHER PUBLICATIONS

Tape Rules Metrica Magneteforte. [online]. Metrica [retrieved on May 8, 2011]. Retrieved from the Internet: <URL: http://www.metrica.it/sito/dettaglio.php?id=151>.

(Continued)

*Primary Examiner* — Yaritza Guadalupe-McCall
(74) *Attorney, Agent, or Firm* — Pillsbury Winthrop Shaw Pittman LLP

(57) ABSTRACT

Disclosed is a rule assembly having a housing, a reel rotatably mounted in the housing, an elongated blade arranged to be wound on the reel and to be extendable through an opening in the housing, and an end hook member having a mounting portion attached to the elongated blade and a hook portion. The end hook member is capable of limited movement relative to the blade between an extended position and a retracted position. The rule assembly has a magnet assembly removably attachable to the elongated blade. The magnet assembly has a mounting portion and a magnet. The mounting portion is configured to removably fix the magnet assembly relative to the blade such that a forward surface of the magnet is removably fixed at a position that is aligned with or approximately aligned with a forward surface of the hook portion with the end hook member in its retracted position.

28 Claims, 14 Drawing Sheets

U.S. PATENT DOCUMENTS

| | | |
|---|---|---|
| D470,063 S | 2/2003 | Arnold |
| D471,474 S | 3/2003 | Hendershott |
| 6,546,644 B2 | 4/2003 | Poineau et al. |
| 6,568,099 B2 | 5/2003 | Bergeron |
| 6,637,126 B2 | 10/2003 | Balota |
| 6,663,153 B2 | 12/2003 | Brunson |
| 6,678,967 B1 | 1/2004 | Jueneman |
| 6,839,981 B2 | 1/2005 | Rafter |
| 6,874,245 B2 | 4/2005 | Liu |
| 6,931,734 B2 | 8/2005 | Elder et al. |
| 6,931,753 B2 | 8/2005 | Ryals et al. |
| 6,976,318 B2 | 12/2005 | Odachowski |
| D514,962 S | 2/2006 | Armendariz |
| 7,124,515 B2 | 10/2006 | Juenemann |
| D533,797 S | 12/2006 | Jueneman |
| 7,159,331 B2 | 1/2007 | Critelli et al. |
| D547,681 S | 7/2007 | Nelson et al. |
| 7,240,439 B2 | 7/2007 | Critelli et al. |
| 7,260,898 B2 | 8/2007 | Snelson |
| D551,996 S | 10/2007 | Armendariz |
| 7,406,778 B2 | 8/2008 | Lee et al. |
| 7,475,492 B1 | 1/2009 | Huang |
| 7,487,600 B1 | 2/2009 | Cooper |
| 7,490,414 B2 | 2/2009 | Critelli et al. |
| 7,555,845 B2 | 7/2009 | Critelli et al. |
| 7,627,958 B2 | 12/2009 | Tallon et al. |
| 7,669,347 B1 | 3/2010 | Huang |
| 7,805,855 B2 | 10/2010 | Seo |
| 7,854,074 B2 | 12/2010 | Zhou |
| 7,918,037 B1 | 4/2011 | Polkhovskiy |
| 2002/0184783 A1* | 12/2002 | Poineau et al. ................. 33/758 |
| 2003/0167651 A1 | 9/2003 | Pedersen |
| 2006/0283036 A1 | 12/2006 | Huang |
| 2007/0074418 A1* | 4/2007 | Critelli et al. ................... 33/758 |
| 2009/0064525 A1 | 3/2009 | Chen |
| 2009/0178291 A1 | 7/2009 | Huang |
| 2009/0288307 A1* | 11/2009 | Zhou ............................... 33/758 |
| 2009/0307920 A1 | 12/2009 | Schrage |
| 2010/0050456 A1* | 3/2010 | Huang ............................ 33/770 |
| 2010/0139110 A1 | 6/2010 | Germain |
| 2010/0175273 A1* | 7/2010 | Seo ................................. 33/770 |
| 2011/0179661 A1* | 7/2011 | Delneo et al. ................... 33/758 |
| 2011/0179664 A1* | 7/2011 | Delneo et al. ................... 33/770 |
| 2012/0073155 A1* | 3/2012 | Mabey ............................ 33/770 |
| 2012/0073156 A1* | 3/2012 | DeLaRosa et al. ............. 33/770 |
| 2012/0159799 A1* | 6/2012 | Murray et al. .................. 33/770 |

FOREIGN PATENT DOCUMENTS

| | | |
|---|---|---|
| DE | 202005014600 U1 | 11/2005 |
| DE | 102007037136 A1 | 2/2009 |
| EP | 1 247 061 B1 | 10/2002 |
| EP | 1 772 700 | 4/2007 |
| EP | 2 098 817 | 9/2009 |
| FR | 2889302 | 2/2007 |
| JP | 2006-242661 | 9/2006 |
| JP | 2006-329849 | 12/2006 |

OTHER PUBLICATIONS

Search Report and Search Opinion as issued for European Patent Application No. 11193705.8, dated Apr. 11, 2012.

* cited by examiner

TAPE RULE WITH REMOVABLE MAGNET ASSEMBLY

CROSS REFERENCE TO RELATED APPLICATION(S)

This patent application claims priority to provisional patent application 61/426,246 filed on Dec. 22, 2010, and is incorporated by reference herein in its entirety.

BACKGROUND

1. Field

The present disclosure relates to rule assemblies.

2. Description of Related Art

A typical tape rule assembly includes an elongated metal rule blade that is mounted on a reel rotatably disposed within a housing. The rule blade is retracted into the housing for storage by coiling it about the reel. To measure a work-piece, a length of the rule blade is pulled out of the housing to span the distance to be measured and the blade or hook is held against the work-piece so that gradation lines and numbers printed on the blade can be read against a point on the workpiece. To measure a distance between two objects or surfaces, an end hook at the free end of the blade may be temporarily secured or placed against an object or surface. In addition, long tape assemblies are known in which an elongated tape (not typically metal) is wound on a reel and can be extended to measure distances. These long tape assemblies may also utilize an end hook.

Some rule assemblies may also provide a magnetic connection to a metallic (ferromagnetic or magnetic) object or surface via a magnet on the tape end hook or blade. The present disclosure provides benefits over the prior art devices.

SUMMARY

One aspect relates to a rule assembly that includes a housing, a reel rotatably mounted in the housing, and an elongated blade arranged to be wound on the reel and to be extendable through an opening in the housing, the elongated blade having an end hook member on a free end thereof The end hook member includes a mounting portion and a hook portion. The mounting portion is attached to the elongated blade, and the hook portion has a forward surface and a rearward surface. The end hook member is capable of limited movement relative to the blade between an extended position and a retracted position. The rule assembly also has a removably attachable magnet assembly. The magnet assembly includes a mounting portion and a magnet. The mounting portion is configured to removably fix the magnet assembly relative to the elongated blade such that a forward surface of the magnet is removably fixed at a position that is aligned with or approximately aligned with the forward surface of the hook portion with the end hook member in its retracted position.

Another aspect relates to a blade and hook assembly. The blade and hook assembly includes an elongated blade; a reel rotatably mounted in the housing; and an end hook member having a mounting portion and a hook portion. The mounting portion is attached to the elongated blade, and the hook portion has a forward surface and a rearward surface. The end hook member is capable of limited movement relative to the blade between an extended position and a retracted position. The blade and hook assembly also includes a removably attachable magnet assembly having a mounting portion and a magnet. The mounting portion of the magnet is configured to removably fix the magnet assembly relative to the elongated blade such that a forward surface of the magnet is removably fixed at a position that is aligned with or approximately aligned with the forward surface of the hook portion with the end hook member in its retracted position.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one example of the disclosure, the structural components illustrated herein can be considered drawn to scale. It is to be expressly understood, however, that many other configurations are possible and that the drawings are for the purpose of example, illustration and description only and are not intended as a definition or to limit the scope of the disclosure. It shall also be appreciated that the features of one embodiment disclosed herein can be used in other embodiments disclosed herein. As used in the specification and in the claims, the singular form of "a", "an", and "the" include plural referents unless the context clearly dictates otherwise.

DETAILED DESCRIPTION

Figure 1:
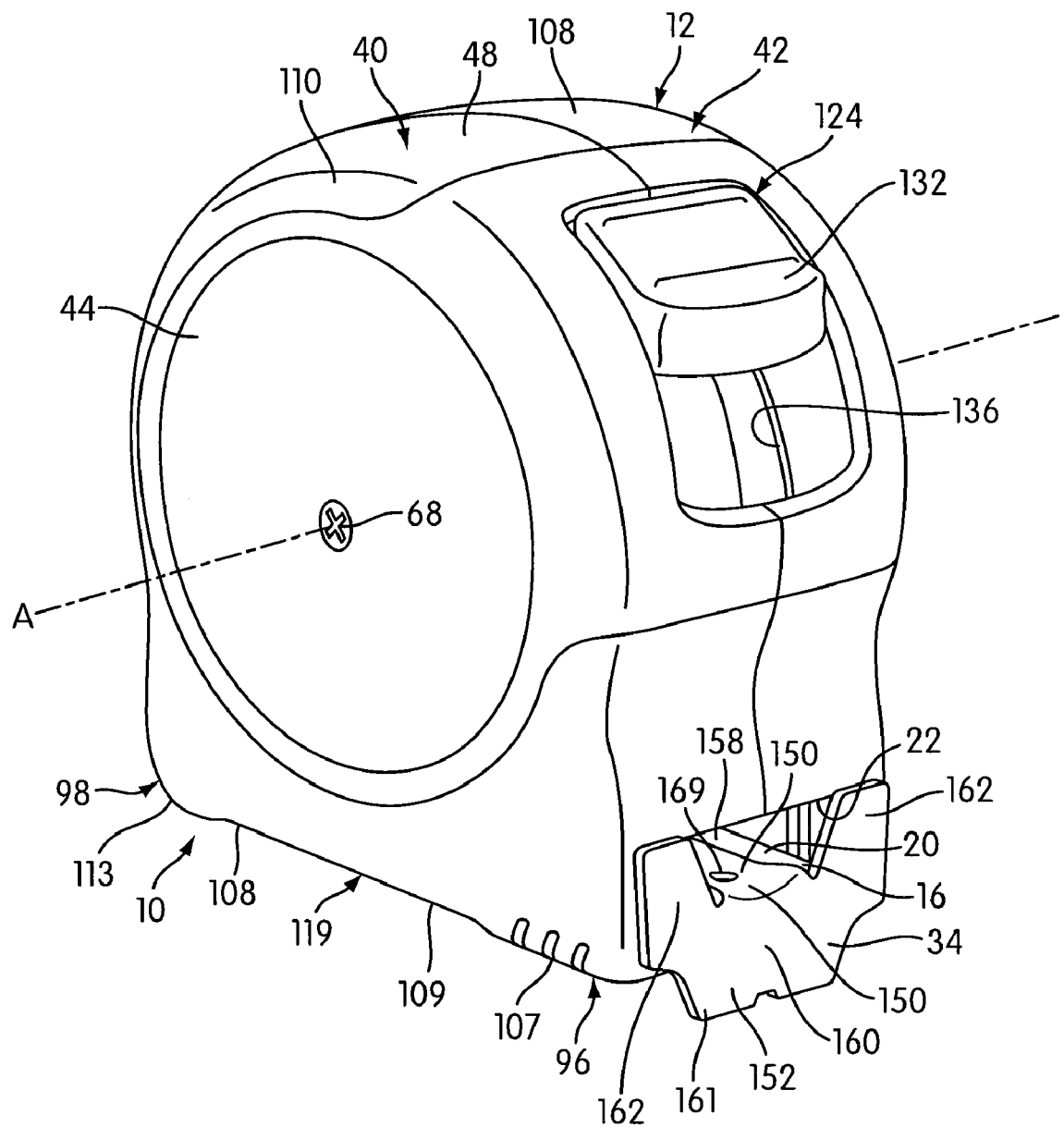
FIG. 1 shows a perspective view of a rule assembly in accordance with an embodiment of the present disclosure.
Figure 2:
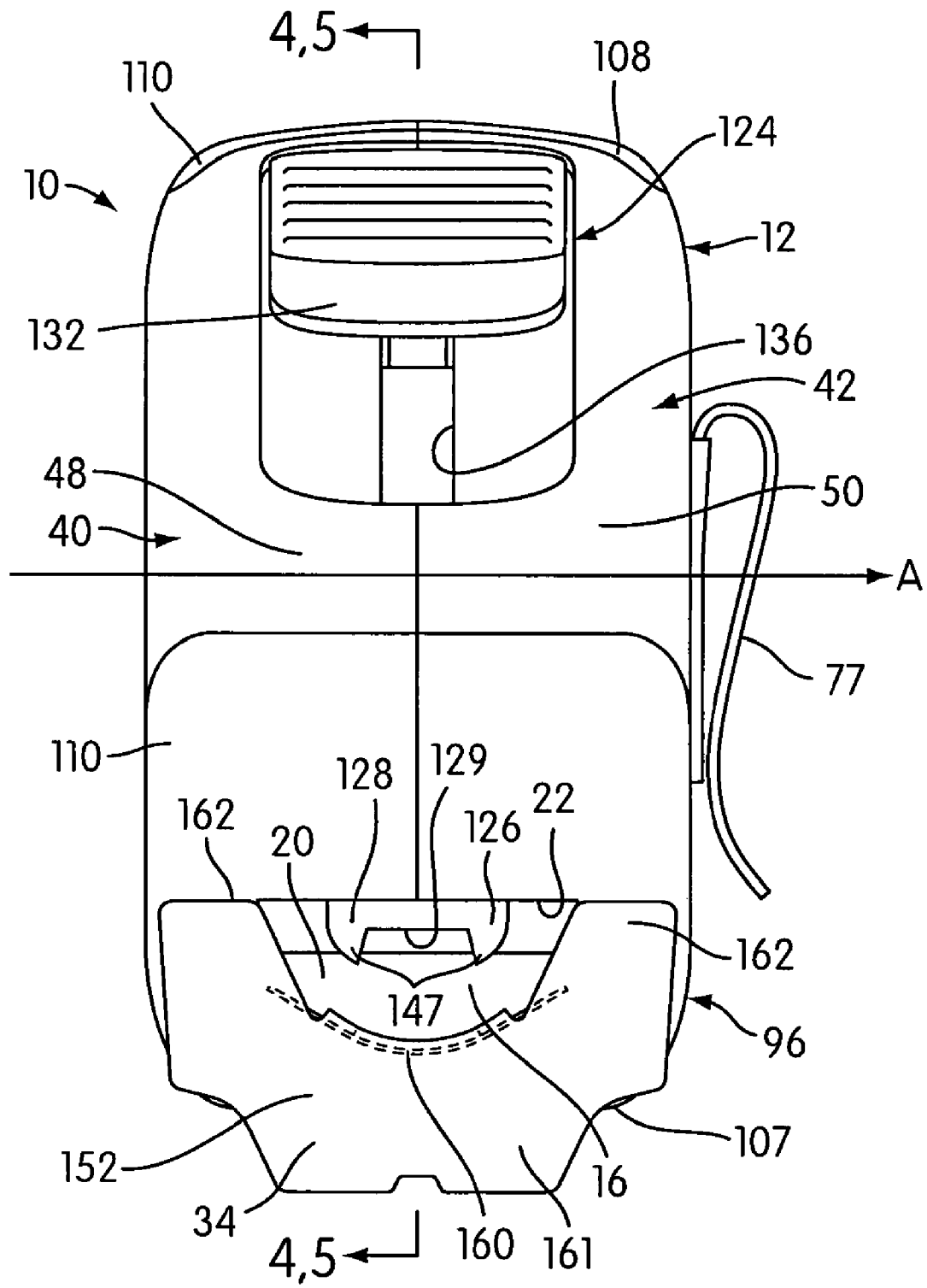
FIG. 2 shows a front of elevational view of the rule assembly in accordance with an embodiment of the present disclosure.

FIGS. 1-6 show a rule assembly 10 in accordance with various embodiment of the present disclosure. The rule assembly shown in FIGS. 1-6 can, for example, be of the type illustrated and described in U.S. application Ser. No. 12/898,352, filed on Oct. 5, 2010, entitled "Tape Rule and End Hook Therefore" and/or U.S. Provisional Application Ser. No. 61/299,224, filed on Jan. 28, 2010, both which are incorporated herein by reference in their entirety. The reference numerals shown in FIGS. 1-6 correspond to those found and described in the aforementioned '352 application, with the corresponding description incorporated by reference herein for the purpose of showing one type of tape rule assembly that the magnetic assembly disclosed herein maybe applied to (with appropriate modification). It should be expressly recognized and appreciated, however, that such description and illustrations relating to FIGS. 1-6 are examples only, and that the present disclosure applies much more broadly to elongated tape rule devices of many kinds and sizes, and having blades of different possible materials.

Figure 4:
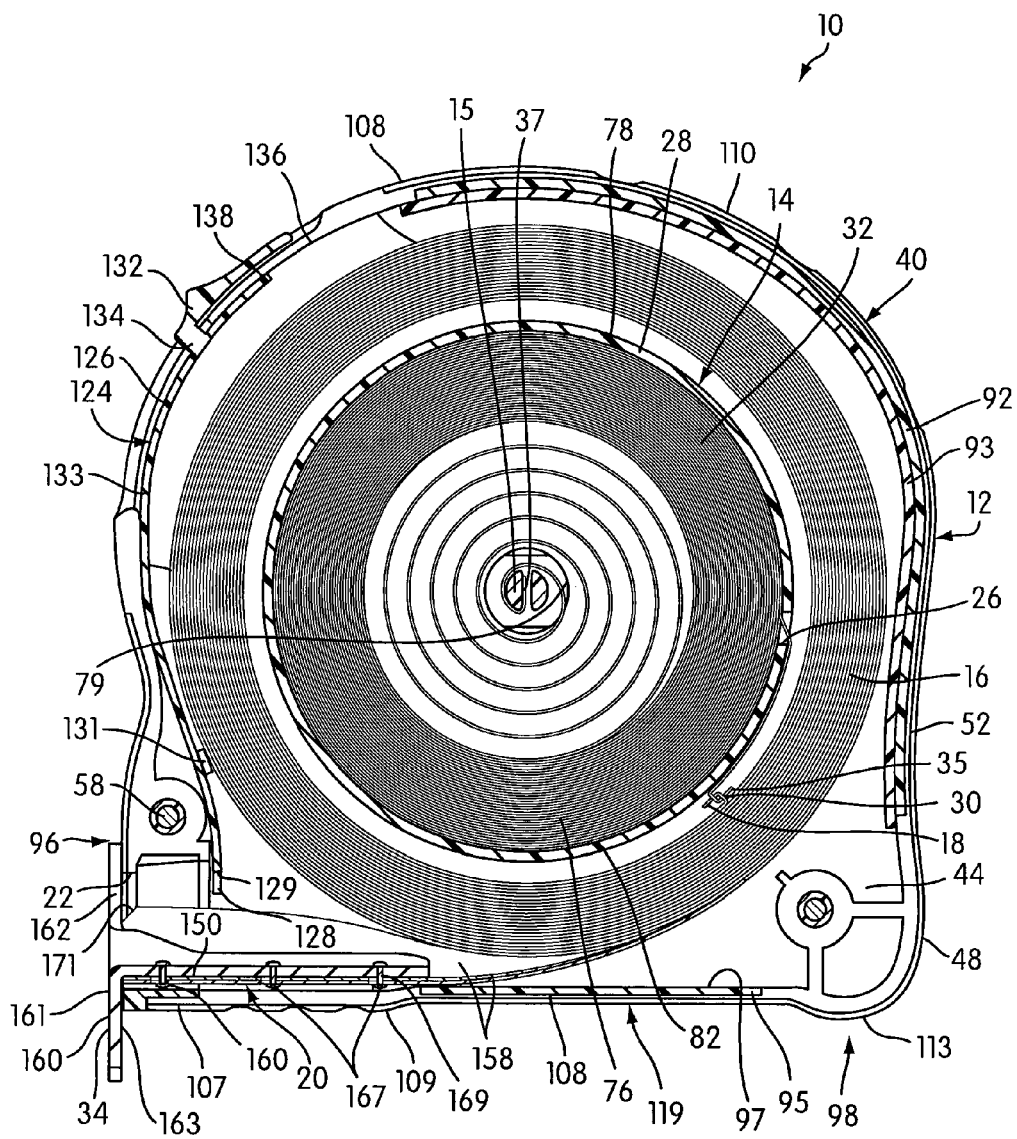
FIG. 4 shows a cross-sectional view of the tape rule assembly taken through the line 4-4 in FIG. 2 showing a blade thereof in a fully retracted configuration in accordance with an embodiment of the present disclosure.
Figure 5:
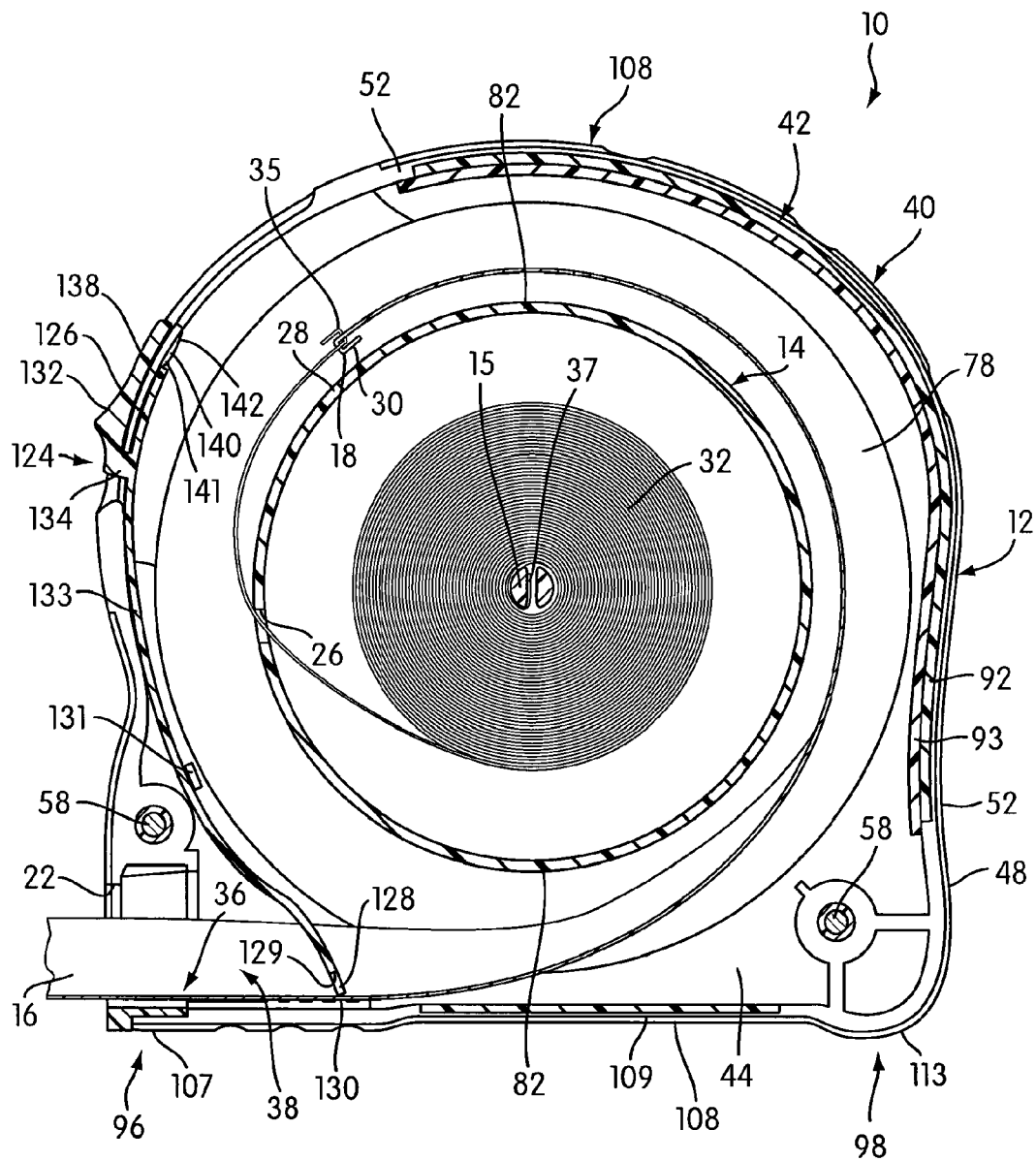
FIG. 5 is a view similar to FIG. 4 except showing the blade in a fully extended configuration in accordance with an embodiment of the present disclosure.
Figure 6:
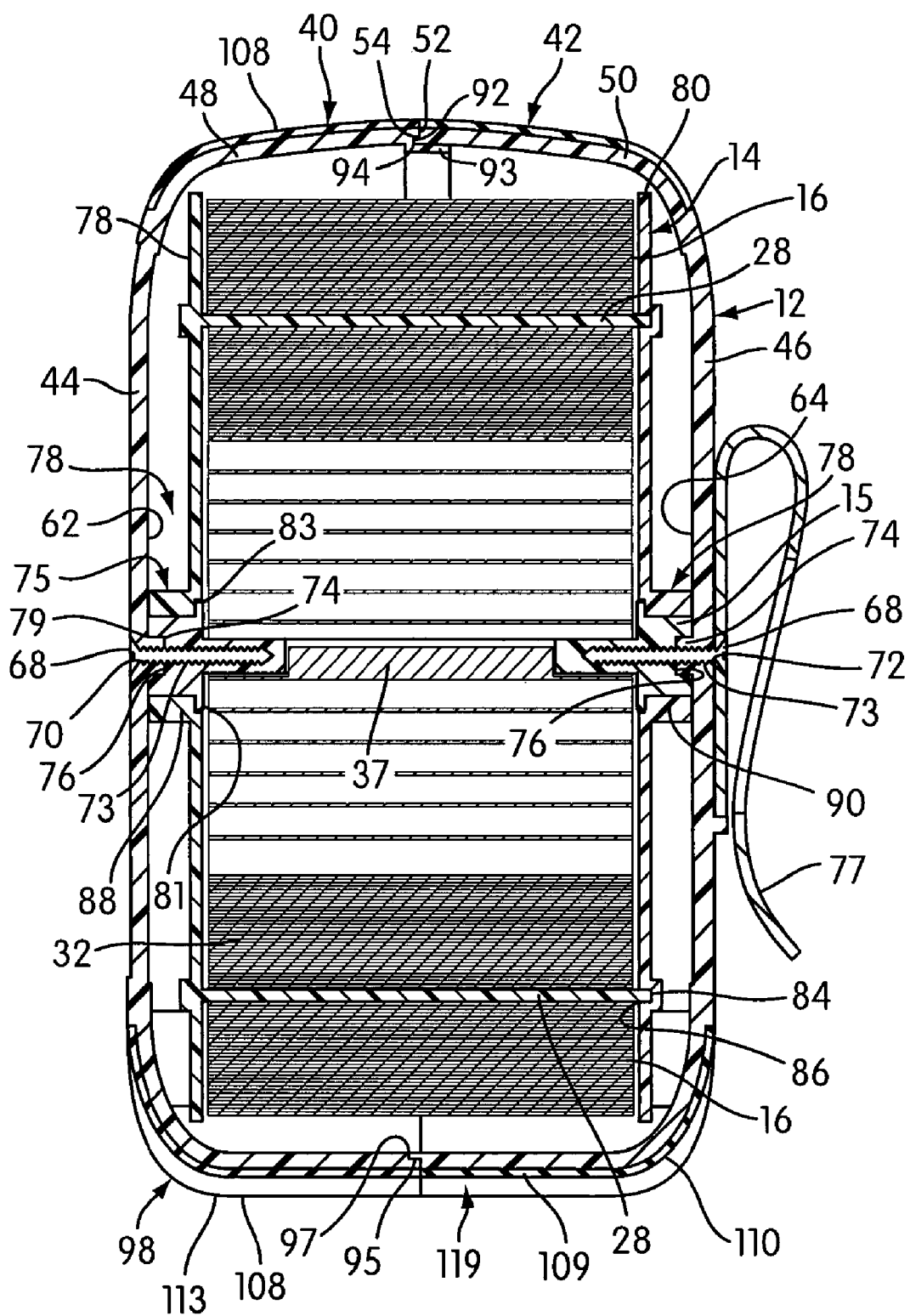
FIG. 6 is a cross-sectional view taken through the line 6-6 in FIG. 3.

In general, the rule assembly 10 includes a housing 12, a reel 14 (as shown in FIGS. 4 and 5) rotatably mounted in the housing 12, and an elongated blade 16 having an end hook member 34 on a free end 20 thereof. The elongated blade 16 is arranged to be wound on the reel 14 and to be extendable through an opening 22 in the housing 12.

FIGS. 7-12 show different views of a tape rule blade 16 and an end hook member 34. As shown in FIGS. 7-12, the end hook member 34 includes a mounting portion 150 and a hook portion 152 bent or disposed at a generally right angle from an end of the mounting portion 150. In one embodiment, the end hook member 34 is formed of, for example, a sheet metal material (such as steel) of a predetermined thickness.

In one embodiment, the mounting portion 150 has a generally concavo-convex configuration (e.g., to match the concavo-convex curvature of the blade 16). In another embodiment, the mounting portion 150 has a generally flat configuration.

As shown in FIGS. 1-4, the end hook member 34 is mounted at the free end 20 of the blade 16 with the mounting portion 150 thereof secured in engagement with a concave (upper) side of the free end 20 of the blade 16 and in overlying relation thereto.

In one embodiment, the connection between the blade 16 and the mounting portion 150 may permit limiting sliding movement therebetween.

Figure 7:
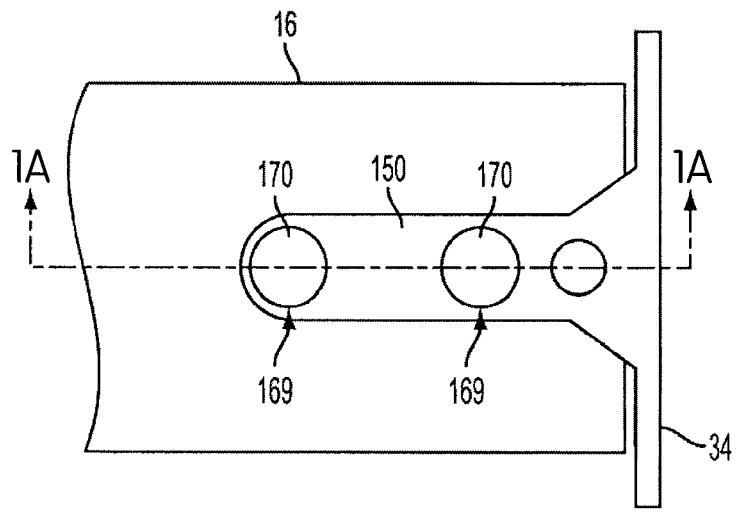
FIG. 7 shows a top view of an end hook member in accordance with an embodiment of the present disclosure.
Figure 7A:
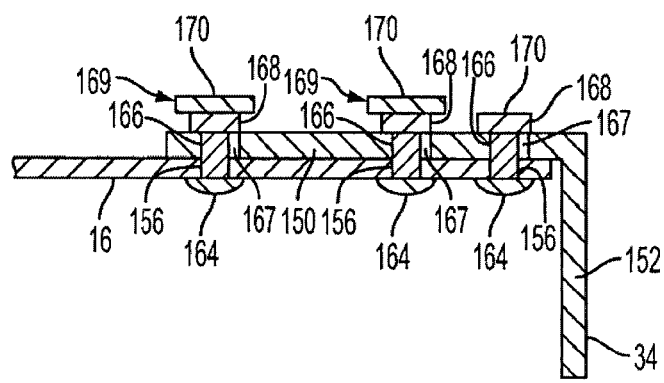
FIG. 7A a cross-sectional view taken through the line 1A-1A in FIG. 7 showing the end hook in a first (extended) position.
Figure 7B:
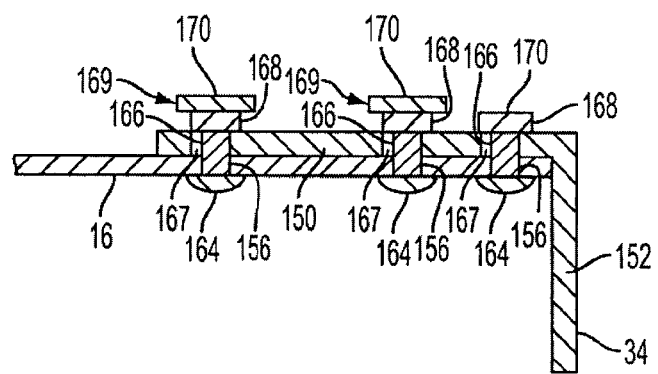
FIG. 7B a cross-sectional view taken through the line 1A-1A in FIG. 7 showing the end hook in a second (retracted) position.

Specifically, as shown in FIGS. 4, 7, 7A, and 7B, the mounting portion 150 is provided with holes 167 (FIGS. 7A and 7B) that may be substantially aligned with openings 156 in the elongated blade 16. A plurality of rivets 169 extend through the holes 167 and openings 156 to slidably mount the end hook member 34 to the blade 16 for limited longitudinal relative movement between the end hook member 34 and the blade 16. For example, in some embodiments, each rivet 169 comprises a bottom portion 164, a shaft portion 166, and a top portion 170. In some embodiments, one or more of the rivets 169 may also comprise an upper or intermediate portion 168. The bottom portion 164 is sized such that its width or diameter is greater than a diameter of opening 156. A diameter of shaft portion 166 is smaller than the width or diameter of the bottom portion 164 such that it may be inserted through both openings 156 and holes 167. The upper or intermediate portion 168 may comprise a diameter that is greater than the shaft portion 166 and the opening 167. The top portion 170 has a diameter that is greater than that of the intermediate portion 168 and the opening 167. In some embodiments, the diameter of each hole 167 is greater than the diameter of the associated narrow portion of rivet 169 (e.g., shaft portion 166) by an amount approximately equal to the desired amount of hook movement. FIGS. 7A and 7B show the end hook member 34 in a first or extended position (extended away from an end of the blade 16) and in a second or retracted position (pushed toward an end of the blade 16), respectively. When the end hook member 34 is in the extended position, the inner surface 163 of hook portion 152 may be spaced from the elongated blade 16. When the end hook member 34 is in the retracted position, the inner surface 163 of the hook portion 152 may be closer to or in contact with the elongated blade 16. The end hook member 34 may be positioned in a retracted position when its outer or forward surface 161 is pushed against an object or a surface to which (or from which) a distance is measured. The limited sliding engagement allows the blade 16 to be measured externally from the outer surface 161 of the hook portion 152, or internally from an internal surface 163 of the hook portion 152. In other words, the sliding movement of the end hook member 34 allows an accurate measurement to be taken with either surface 161 or 163 in abutting relation with the work-piece. In an embodiment, the hook member 34 moves or slides longitudinally with respect to the blade 16 a distance approximately equal to the thickness of the hook portion 152 (where the thickness is measured from surface 161 to surface 163) so that a measurement taken with either surface 161 or 163 in abutting engagement with the workpiece will yield an accurate measurement.

The dimensions and features of the tape measure mechanism, housing, blade and/or hook member should not be limiting. Just for example, in an embodiment, the tape measure and hook portion 152 may comprise features as disclosed in U.S. application Ser. No. 12/898,352, filed on Oct. 5, 2010, entitled "Tape Rule and End Hook Therefore" and/or U.S. Provisional Application Ser. No. 61/299,224, filed on Jan. 28, 2010, both of which are incorporated herein by reference in their entirety. For example, in some embodiments, the end hook member 34 may be designed with top catching capability, which generally refers to the ability of a portion of the end hook member 34 to hookingly engage with a work-piece to facilitate extension of the blade 16 and to temporarily secure the blade to the work-piece while a measurement is being taken. In such an embodiment, the portion of the end hook member 34 may be a) located above the blade 16 and/or b) located above and to the side of the blade 16. In one embodiment, the hook portion 152 is U-shaped. In another embodiment, the hook portion 152 of the hook member 34 provides an under-catch structure and/or a side catch structure that can hookingly engage a work-piece to facilitate extension of the blade 16 and to temporarily secure the blade to the work-piece while a measurement is being taken. In yet another embodiment, the hook portion 152 may comprise burred portions (e.g., to provide a gripping attribute to edges of the hook member 34). Also, the spacing and depiction of the rivets 169 should not be limited to the illustrated embodiments. For example, the two or more rivets may be positioned such that they are equidistant.

Figure 3:
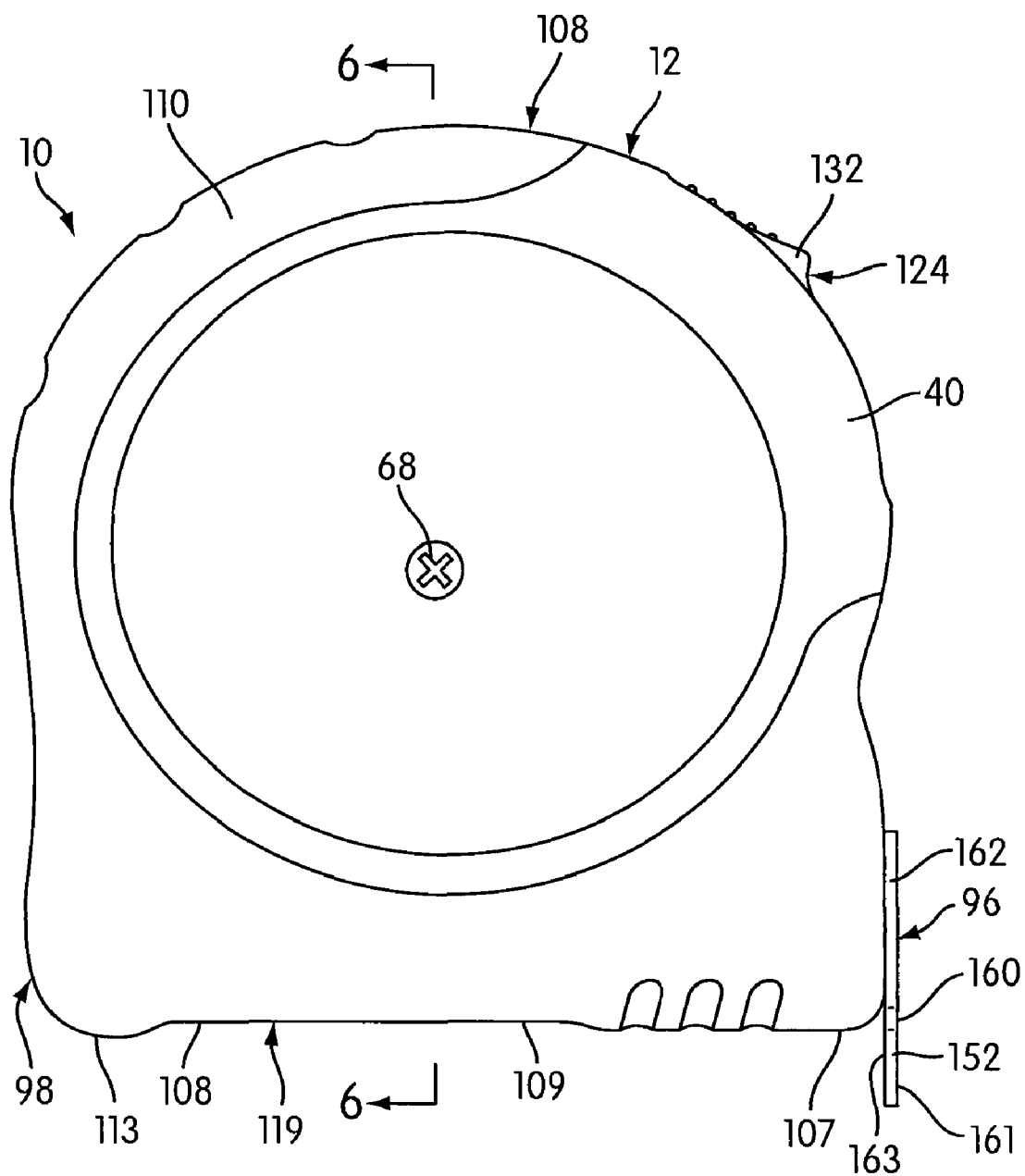
FIG. 3 shows a side of elevational view of the rule assembly in accordance with an embodiment of the present disclosure.

When the blade 16 is fully retracted into the housing 12 (e.g., such as shown in FIGS. 1, 3 and 4), the blade 16 may be extracted by pulling the hook member 34 from behind its lower edge (i.e., below the blade 16). In one embodiment, the end hook member 34 gives the user access to extract the hook member 34 from its side edges as well.

In one embodiment, the end hook may be formed from various types of metal material. For example, in one embodiment, the end hook is formed from high carbon steel.

In accordance with various embodiments, the tape rule assembly 10 comprises a magnet assembly removably attachable to the elongated blade 16. FIGS. 8-15 illustrate different embodiments of magnet assemblies removably attachable to the elongated blade 16. However, such embodiments are not intended to be limiting. As described in the illustrated embodiments below, for example, the magnet assembly comprises a mounting portion and a magnet. In an embodiment, the mounting portion is configured to removably fix the magnet assembly relative to the elongated blade 16 such that a forward surface of the magnet is removably fixed at a position that is aligned (lying in generally the same plane) with or approximately aligned with a forward surface 161 of the hook portion 151 with the end hook member 34 in its retracted position (e.g., see FIG. 7B). In some embodiments, the forward surface of the magnet is removably fixed at a position that is slightly recessed from (positioned rearwardly of a plane defined by) the forward surface 161 of the hook portion 151 with the end hook member 34 in its retracted position.

In some embodiments, the magnet assembly may be directly attached to (or in contact with) the elongated blade 16. In other embodiments, the magnet assembly is removably attached to (or contacts) the elongated blade 16 through the end hook member 34. For example, as described above, the end hook member 34 may be attached to the elongated blade 16 using rivets 169. In accordance with various embodiments, the magnet assembly is removably attached to the rivets 169. In any of such embodiments, it is possible to removably attach the magnet assembly to rivets 169 such that a forward surface of the magnet can be disposed in alignment with (lying in generally the same plane) or slightly recessed from (rearwardly of a plane defined by) the forward surface 161 of the hook portion 152.

In various embodiments, when the magnet assembly is attached to the elongate blade 16 (e.g., via rivets 169), the magnet itself is spaced from the end hook member 34 and the blade 16. For example, a magnet housing of the assembly may be configured to hold and/or position the magnet above and out of contact with the end hook member 34. In one embodiment, the end hook member 34 is capable of limiting sliding movement relative to the blade 16 and to the magnet.

In some embodiments, the rivets 169 may be attachment rivets for receiving the magnet assembly. The number and position of rivets 169 along the blade and/or relative to each other should not be limited. For example, the plurality of rivets used to attach end hook member 34 and blade 16 may include a combination of types of rivets. In an embodiment, such as shown in FIG. 7A, attachments rivets 169 and a forward-most rivet 172 are used to attach end hook member 34 and blade 16. The attachment rivets 169 are configured to enable magnet assembly 400 to be attached thereto. For example, as will become further evident in the description below, attachment rivets 169 may include upper or intermediate portion 168 which secures the end hook member 34 and blade 16 together, and which can also provide an area (e.g., between a top surface of mounting portion 150 of end hook member 34 and a lower surface of top portion 170 of a rivet 169) for receiving the magnet assembly. A top of the forward-most rivet 172 may be positioned adjacent the mounting portion 150 of the end hook member 34.

Figure 8:
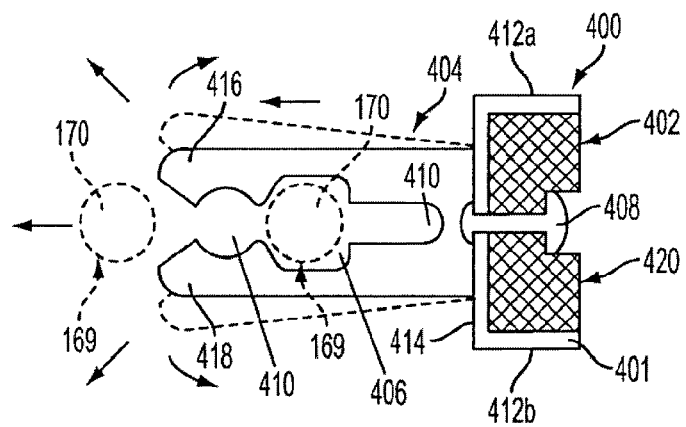
FIG. 8 shows a top view of an end hook member and magnet mechanism in accordance with an embodiment of the present disclosure.

FIG. 8 illustrates a top view of a magnet assembly 400 in accordance with an embodiment with a magnet 402 and a mounting portion 404. More specifically, in this illustrated embodiment, magnet assembly 400 comprises a housing 401 having at least side walls 412a and 412b extending from a back wall 414. Housing 401 may further comprise a bottom wall and/or top wall. Magnet 402 may be secured within housing 401 to back wall 414 using a bolt, rivet, or other type of attachment 408. In one embodiment, the magnet is overmolded with plastic or resilient material so as to be partially or wholly encapsulated therein. In some embodiments, magnet 402 and back wall 414 may be formed such that a hole or opening is provided in each to receive rivet 408 therethrough, for example. Alternatively, the magnet 402 may be secured to side walls 412a and 412b of housing 401. It is also envisioned that other attachment devices (e.g., adhesive) may be used to secure magnet 402 within housing 401. As described with respect to FIGS. 11 and 12, when the magnet assembly 400 is secured to the blade 16 or end hook member 34, a forward surface 420 of the magnet 402 is removably fixed at a position that is aligned with or slightly recessed from a forward surface 161 of the hook portion 152 with the end hook member 34 in its retracted position.

Also shown in FIG. 8 is mounting portion 404 of magnet assembly 400 which extends rearwardly laterally from housing 401. Mounting portion 404 may be attached to one or more walls of housing 401 in any number of ways and should not be limiting. In an embodiment, mounting portion 404 may be attached to back wall 414 or to bottom wall (not shown). In another embodiment, mounting portion 404 may be integrally formed with housing 401.

Mounting portion 404 is configured to removably fix the magnet assembly 400 relative to the elongated blade 16. For example, in the illustrated embodiment of FIGS. 8-12, the mounting portion 404 of the magnet assembly 400 comprises spaced leg sections 416 and 418 configured to at least partially surround one or more of attachment rivets 169 used to attach the end hook member 34 to the elongated blade 16. The spaced leg sections 416 and 418 may comprise a slot 406 therebetween. The slot 406 has lock areas 410 or openings. The number of lock areas 410 or openings should not be limited. In an embodiment, the number and/or position of lock areas 410 may correspond to the number and/or position of attachment rivets 169. In another embodiment, less or more lock areas 410 than the attachment rivets 169 may be provided in the slot 406. In an embodiment, each lock area 410 or opening comprises a shape complimentary to a shape of one or more of the attachment rivets 169. For example, the lock areas 410 may be formed such that upper or intermediate portion 168 of rivets may be positioned therein, with the leg sections 416, 418 trapped between the top surface of the end hook mounting portion 150 and the under surface of the top portion (or head) 170 of rivets 169. Alternatively, in other embodiments, the lock areas 410 may be formed to have shaft portions 166 positioned therein. The lock areas 410 may at least partially surround one or more rivets 169 when the magnet assembly 400 is removably fixed to the elongated blade 16. For example, the lock areas 410 may comprise a substantially round or circular shape so as to surround at least a portion of a body (e.g., intermediate portion 168) of one or more of attachment rivets 169. In an embodiment, spaced leg sections 416 and 418 are resilient members. For example, spaced leg sections 416 and 418 may be configured to flex slightly with respect to one or more rivets 169 during attachment (or removal) of the magnet assembly 400 to the elongated blade 16.

For example, as shown by the arrows in FIG. 8, when the magnet assembly 400 is removably attached to the attachment rivets 169 of the blade 16 by moving or sliding mounting portion 150 in a longitudinal direction with respect to the blade 16, the spaced leg sections 416 and 418 may flex outwardly during attachment and may be resiliently biased so as to surround a body of one or more of the attachment rivets 169 after the magnet assembly 400 is attached to the blade 16. The spaced leg sections 416 and 418 may be configured to surround one or more of the rivets 169 at a position above and adjacent to the end hook member 34, for example. A top portion 170 of each of the rivets 169 may be positioned above the spaced leg sections 416 and 418. As shown in the illustrated embodiment, a front lock area 410 may comprise a slot that is configured to frictionally fit around a forwardly positioned attachment rivet 169, and also or alternatively provide a shape locking type connection. A back lock area 410 may comprise a complimentary substantially round or circular shape that surrounds at least a part of attachment rivet 169.

The spaced leg sections 416 and 418 may be made from any number of materials. For example, in an embodiment, the spaced leg sections 416 and 418 comprise spring steel material. In accordance with another embodiment, other resilient materials, such as plastic or rubber, may also be used. Moreover, in an embodiment, the material used to form the spaced leg sections 416 and 418 is not resilient.

Figure 9:
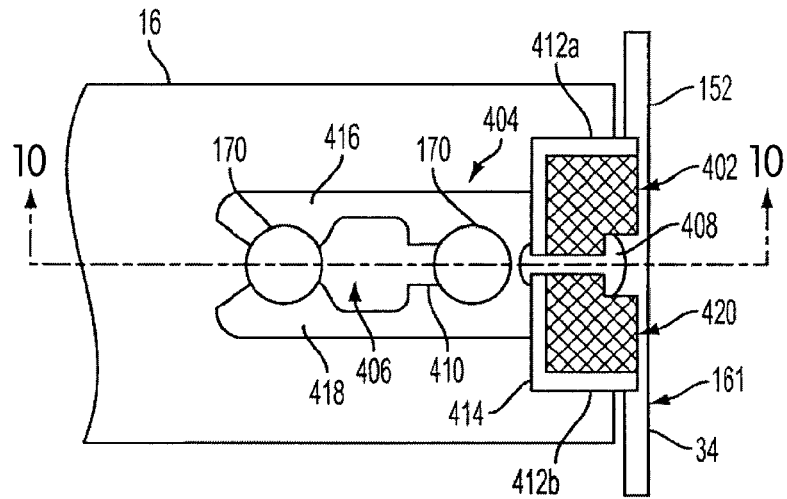
FIG. 9 shows a top view of the end hook member and magnet mechanism of FIG. 8 on an end hook member of a rule assembly in a first (extended) position in accordance with an embodiment of the present disclosure.
Figure 10:
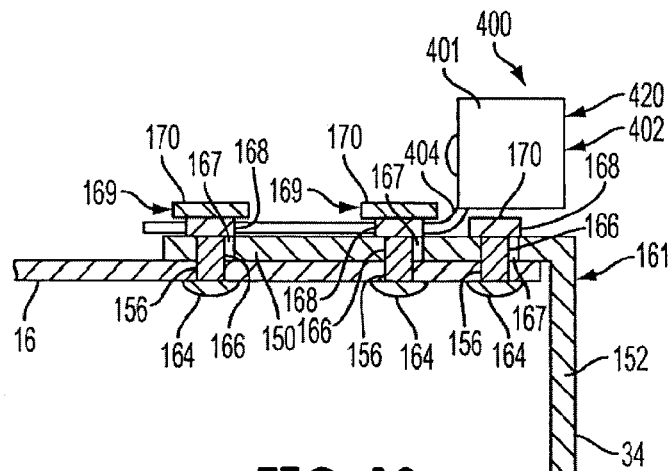
FIG. 10 shows a cross-sectional view taken through the line 10-10 in FIG. 9 of the end hook member and magnet mechanism with the end hook member in the extended position.

FIGS. 9 and 10 illustrate a top view and a cross-sectional view, respectively, of an end of the elongated blade 16 with end hook member 34 attached thereto using rivets 169. The end hook member 34 is in an extended position (such as shown in FIG. 7A). Also shown in this embodiment is magnet assembly 400 attached to attachment rivets 169 and adjacent the end hook member 34. When the end hook member 34 in its extended position, forward surface 420 of the magnet 402 is removably fixed at a position that is at least slightly recessed from forward surface 161 of the hook portion 152.

Figure 11:
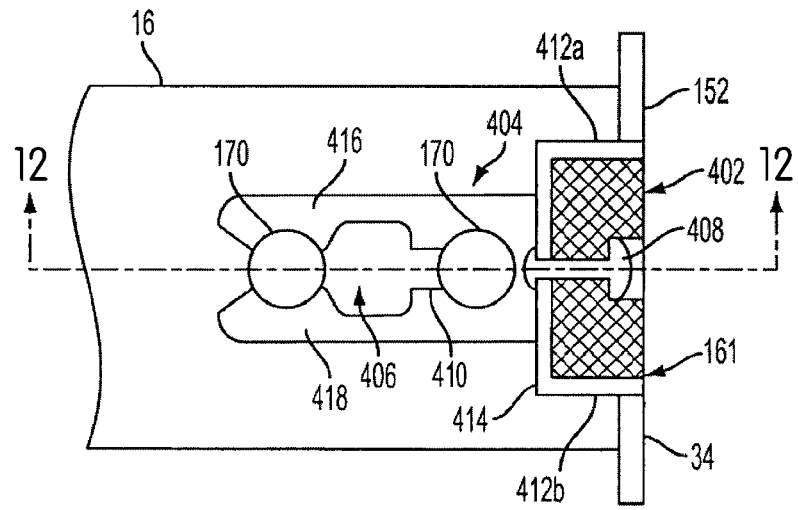
FIG. 11 shows a top view of the end hook member and magnet mechanism of FIG. 8 on the end hook member in a second (retracted) position in accordance with an embodiment of the present disclosure.
Figure 12:
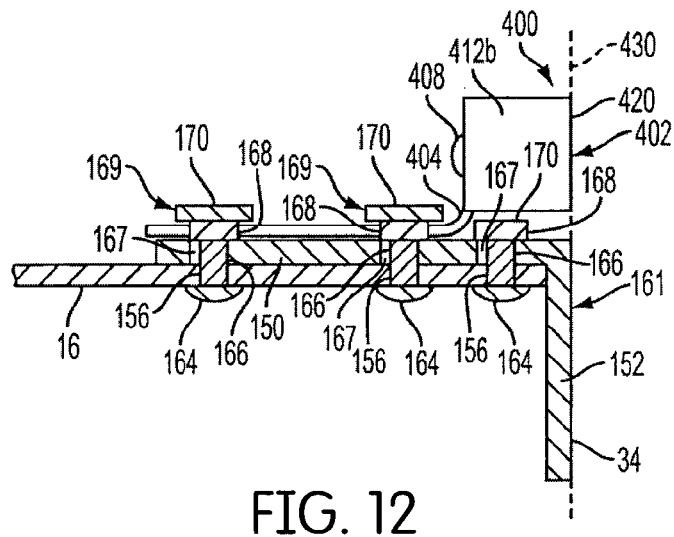
FIG. 12 shows cross-sectional view taken through the line 12-12 in FIG. 11 of the end hook member and magnet mechanism with the end hook member in a retracted position.

As previously described, in accordance with an embodiment, end hook member 34 is capable of limited movement relative to the blade 16 between an extended position (see FIG. 7A) and a retracted position (see FIG. 7B). FIGS. 11 and 12 illustrate a top view and a cross-sectional view, respectively, of the end hook member 34 of the elongated blade 16 in a retracted position (e.g., in contact with an object or surface). The removably attachable magnet assembly 400, when attached to attachment rivets 169, is configured to remain fixed relative to the blade 16 when the end hook member 34 is moved. When the end hook member 34 is moved to its retracted position, forward surface 420 of the magnet 402 is removably fixed at a position that is aligned with or, alternatively, slightly recessed from forward surface 161 of the hook portion 152. The end hook member 34 retains this ability to slide relative to the blade 16 when the magnet assembly 400 is removably attached to the blade 16. In some embodiments, the mounting portion 404 is configured to removably fix the magnet assembly 400 such that the forward surface 420 of the magnet 402 is aligned with the forward surface 161 of the hook portion 152 with the end hook member 34 in its retracted position.

In other embodiments, the forward surface 420 of the magnet is slightly recessed from the forward surface 161 when hook portion 152 is retracted, but sufficiently close to magnetically adhere to a metal object.

When the magnet assembly 400 is not desired to be used, it can be removed. Specifically, the magnet assembly 400 may be moved in a lateral direction and/or upward direction relative to the blade 16. When the magnet assembly is moved away from rivets 169 (e.g., in an opposite direction as shown by the arrows of FIG. 8), one or both of the spaced leg sections 416 and/or 418 may be slightly biased outwardly from one or more rivets 169. The movement in the lateral direction releases front attachment rivet 169 from its friction fit with front lock area 410 and into slot 406. A back attachment rivet 169 is unlatched from back lock area 410 and out of position from spaced leg sections 416 and 418. The magnet assembly 400 may then be moved or lifted from the elongated blade 16.

In some embodiments, the magnet 402 has sufficiently high Gauss level in relation to the weight of all of the components of the tape rule assembly 10, such that the entire tape rule assembly can be self-supportedly attached to a ferrous metallic object. In one example, with the blade 16 locked within the housing 12, the magnet 402 can be adhered to an overhead, horizontally disposed magnetic metallic material, and the magnetic attraction can be sufficiently strong to adhere to the entire tape measure assembly 10 (include its entire own weight) to the surface. It should be appreciated, however, that lesser strength magnets can also be used.

Figure 13:
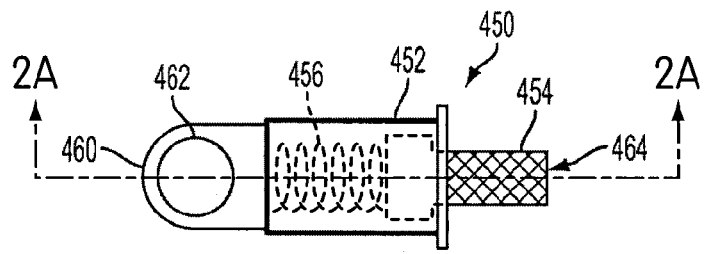
FIG. 13 shows a top view of an end hook member and magnet mechanism in accordance with an embodiment of the present disclosure.
Figure 14:
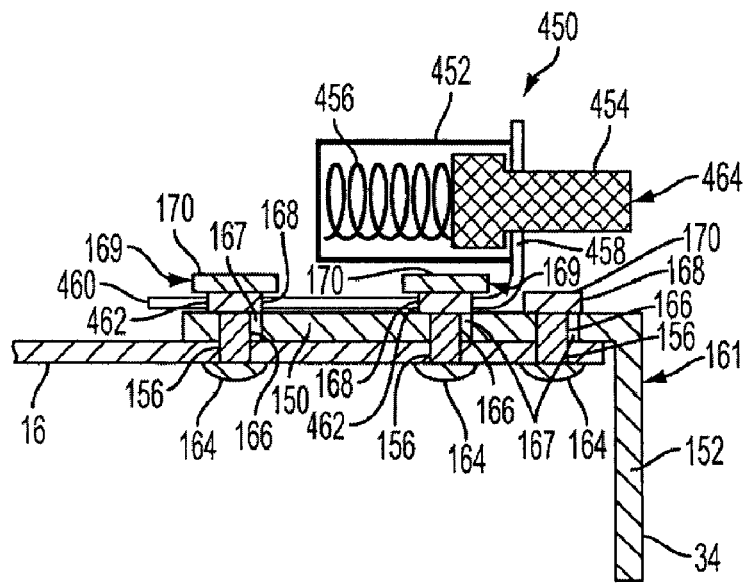
FIG. 14 shows a cross-sectional view of the magnet mechanism taken through the line 2A-2A in FIG. 13 of the end hook member and magnet mechanism on an end hook member of a rule assembly in a first (extended) position in accordance with an embodiment of the present disclosure.
Figure 15:
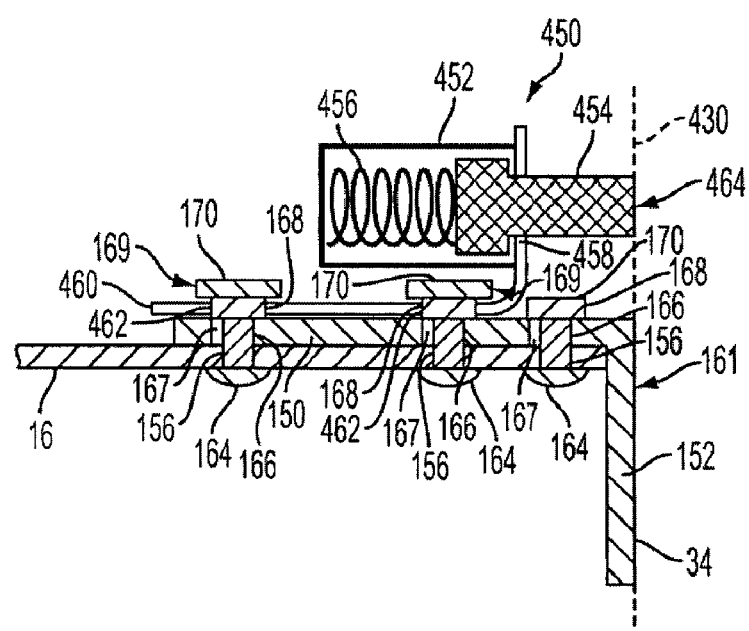
FIG. 15 shows a cross-sectional view of the magnet mechanism taken through the line 2A-2A in FIG. 13 of the end hook member and magnet mechanism on the end hook member of the rule assembly in a second (retracted) position in accordance with an embodiment of the present disclosure.

FIGS. 13-15 illustrate other embodiments of a magnet assembly 450 with a magnet 454 and a mounting portion 460. More specifically, in this illustrated embodiment, magnet assembly 450 comprises a housing 452 having top wall, bottom wall, side walls and a back wall. Magnet 454 may be secured within housing 452. The magnet assembly 450 further comprises a resilient member 456 that biases the magnet 454 in a forward direction such that a forward surface 464 of the magnet 454 is removably fixed at a position that is aligned with or slightly recessed from forward surface 161 of the hook portion 152 with the end hook member 34 in its retracted position. The end hook member 34 retains this ability to slide relative to the blade 16 when the magnet assembly 450 is attached. The magnet 454 may be attached to the resilient 456 member using an attachment device, such as adhesive. In an embodiment, the resilient member 456 is a coil spring. The coil spring 456 may be biased in a forward direction within housing 452 such that magnet 454 extends forwardly therefrom. The magnet 454 may be moveable in an axial direction with respect to housing 452. For example, the coil spring 456 may enable magnet 454 to move in a rearward direction with respect to housing 452 (e.g., move within housing). The magnet 454 and coil spring 456 may absorb an impact force (such as if tape rule assembly 10 was dropped). The coil spring 456 may allow for movement of the magnet 454 when approach angles of the end of the blade 16 vary. In an embodiment, the coil spring 456 is substantially enclosed within housing 452, Also shown in FIGS. 13-15 is mounting portion 460 of magnet assembly 450 which extends laterally from housing 452. Mounting portion 460 may be attached to one or more walls of housing 452 in any number of ways and should not be limiting. In an embodiment, mounting portion 460 may be attached to housing 452 via an upwardly extending portion 458. For example, extending portion 458 may form a front wall of housing 452. The upwardly extending portion 458 may have an opening therein such that magnet 454 extends therethrough in a forward direction. In another embodiment, mounting portion 460 may be integrally formed with housing 452.

Mounting portion 460 is configured to removably fix the magnet assembly 450 relative to the elongated blade 16 (of an end hook member on a rule assembly, such as shown and described above). For example, in the illustrated embodiment of FIGS. 13-15, the mounting portion 460 of the magnet assembly 450 comprises at least one opening 462 for mounting on rivets 169 of end hook member 34. The number of openings 462 should not be limited. In an embodiment, the number and/or position of openings 462 may correspond to the number and/or position of attachment rivets 169. In another embodiment, less or more openings 462 than the attachment rivets 169 may be provided in mounting portion 460. For illustrative purposes only, the mounting portion 460 in this embodiment comprises two openings 462 (see cross-sectional views in FIGS. 14-15 for both openings, one opening of which is shown positioned below or underneath housing 452). In an embodiment, each opening 462 comprises a shape complimentary to a shape of one or more attachment rivets 169. The one or more openings 462 may be configured to at least partially surround one or more attachment rivets 169 when the magnet assembly 450 is removably fixed to the elongated blade 16. For example, the one or more openings 462 may comprise a substantially circular shape so as to surround at least a portion of a body (e.g., intermediate portion 168) of one or more of the attachment rivets 169.

In an embodiment, mounting portion 460 is formed from a resilient material, such as plastic or rubber. When mounting portion 460 is mounted onto end hook member 34, openings 462 may be substantially aligned with top portion 170 of rivets 129. The mounting portion 460 may then be stretched and/or biased such that a top portion 170 of one or more rivets 169 may be positioned through the one or more openings 462 to removably attach the magnet assembly 450 to the elongated blade 16.

FIG. 14 illustrates a cross-sectional view of the magnet assembly 450 taken through the line 2A-2A in FIG. 13 of an end of the elongated blade 16 with end hook member 34 attached thereto using rivets 169. The end hook member 34 is in an extended position (such as shown in FIG. 7A). Also shown in this embodiment is magnet assembly 450 removably attached to rivets 169 and adjacent the end hook member 34. When the end hook member 34 in its extended position, forward surface 464 of the magnet 454 is removably fixed at a position that is at least slightly recessed from forward surface 161 of the hook portion 152.

As previously described, in accordance with an embodiment, end hook member 34 is capable of limited movement relative to the blade 16 between an extended position (see FIG. 7A) and a retracted position (see FIG. 7B) when magnet assembly 450 is attached thereto. FIG. 15 illustrates a cross-sectional view of the magnet assembly 450 taken through the line 2A-2A in FIG. 13 with the end hook member 34 in a retracted position (e.g., in contact with an object or surface). When the end hook member 34 is moved to its retracted position, the mounting portion 460 is configured to removably fix the magnet assembly 450 such that forward surface 464 of the magnet 454 is removably fixed at a position that is aligned with or slightly recessed from forward surface 161 of the hook portion 152.

When the magnet assembly 450 is not desired to be used, it can be removed. Specifically, the magnet assembly 450 may be moved in a lateral direction and/or an upward direction relative to the blade 16.

In some embodiments, when the magnet assembly 400 of the embodiment shown in FIGS. 8-12 or magnet assembly 450 of the embodiment shown in FIGS. 13-15 is removably attached in place, the forward surface of the magnet (e.g., such as forward surface 420 of magnet 402 of magnet assembly 400 or forward surface 464 of magnet 454 of magnet assembly 450) is positioned at a theoretical zero point of the tape rule assembly 10. The theoretical zero point is defined as a plane 430 defined at the outside or forward surface 161 of the hook portion 152 when the end hook member 34 is in a retracted position (see FIGS. 12 and 15). Additionally and/or alternatively, the theoretical zero point is defined as a plane defined at the rearward or inner surface 163 of the hook portion 152 when the end hook member 34 is in an extended position. The theoretical zero point is not necessarily in exact alignment with the zero mark on the elongated blade 16. In the exemplary embodiment of FIGS. 13-15, the resilient member 456 may be formed and configured such that the forward surface 464 of the magnet 454 is aligned with plane 430 (i.e., the zero point) when the end hook member 34 is retracted. Also, as shown in the illustrated embodiments, the magnet is not necessarily in exact alignment with the zero mark on the blade 16.

Figure 16:
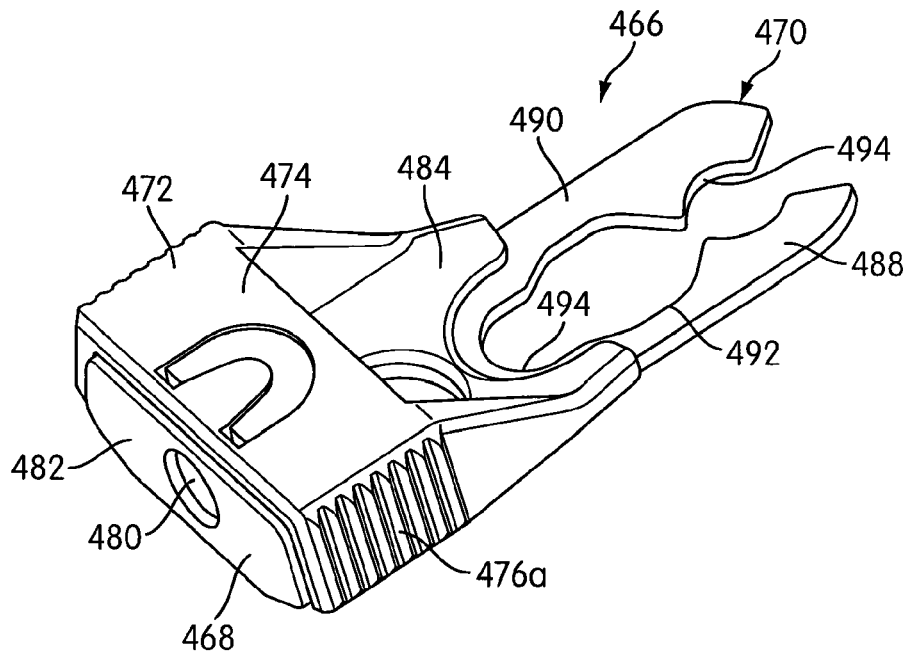
FIG. 16 shows a front perspective view of an end hook member and magnet mechanism in accordance with yet another embodiment of the present disclosure.
Figure 17:
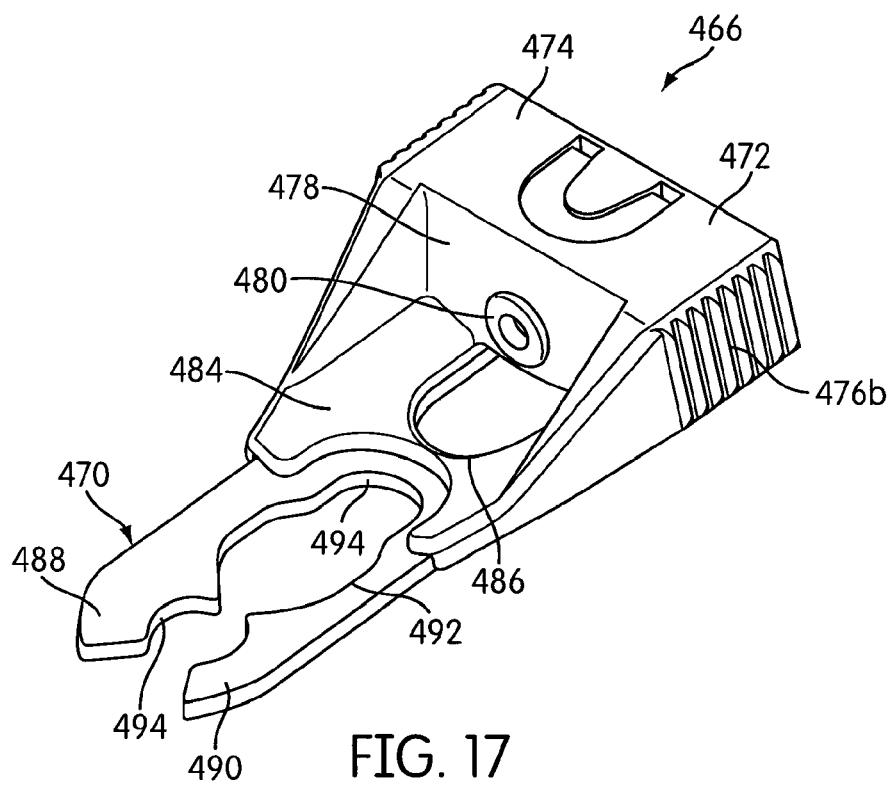
FIG. 17 shows a rear perspective view of the end hook member and magnet mechanism of FIG. 16.
Figure 18:
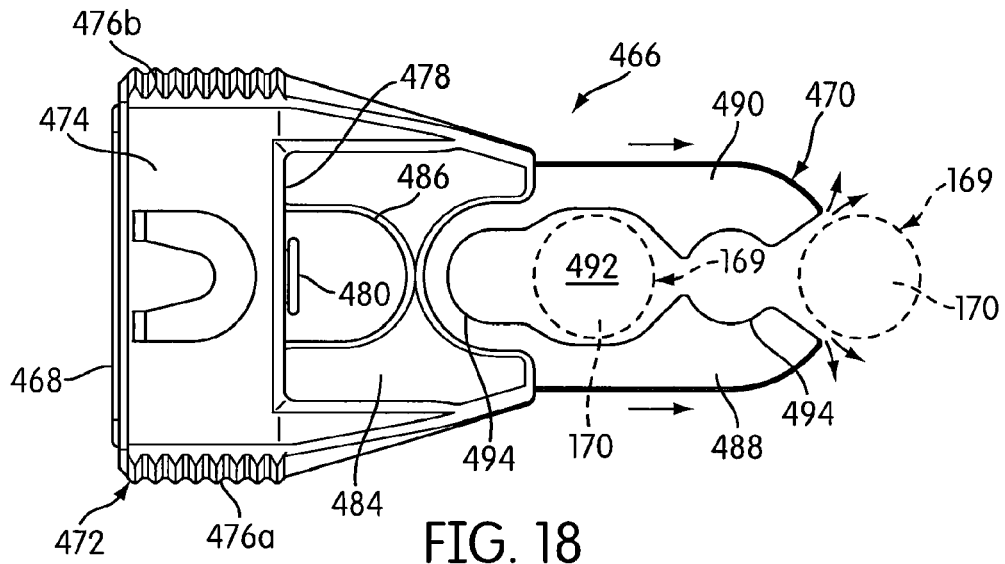
FIG. 18 shows a top view of the end hook member and magnet mechanism of FIG. 16.
Figure 19:
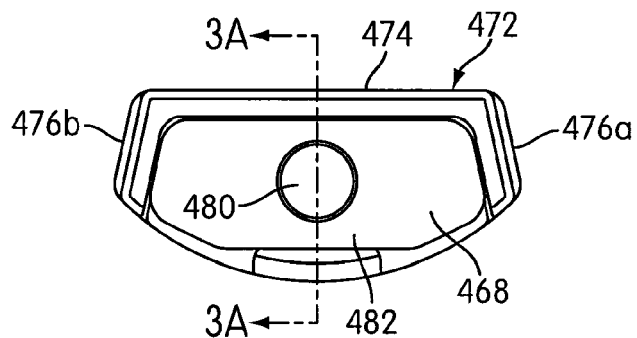
FIG. 19 shows a front view of an end hook member and magnet mechanism of FIG. 16.
Figure 20:
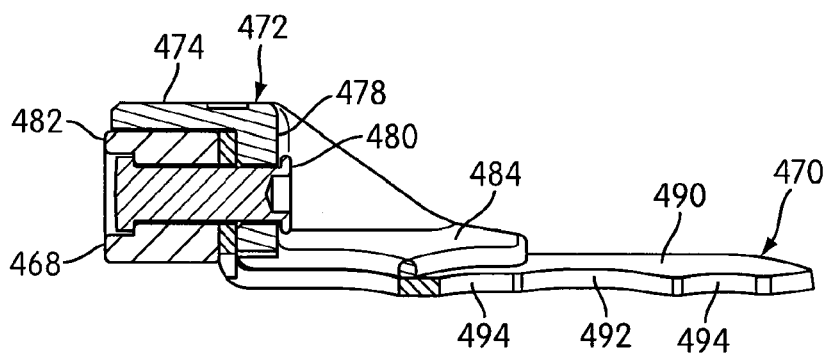
FIG. 20 shows a cross-sectional view taken through the line 3A-3A of the end hook member and magnet mechanism of FIG. 19.

Yet another embodiment of a removably attachable magnet assembly 466 in accordance with the present disclosure is shown in FIGS. 16-20. FIGS. 16, 17, and 18 illustrate a front perspective view, a rear perspective view, and a top view, respectively, of magnet assembly 466 with a magnet 468 and a mounting portion 470. More specifically, in this illustrated embodiment, magnet assembly 466 comprises a housing 472 having at least a top wall 474, side walls 476a and 476b, and a back wall 478. In an embodiment, housing 472 may also comprise an attachment portion 484 extending from back wall 478. Housing 472 may further comprise a bottom wall. In one embodiment, the magnet is over-molded with plastic or resilient material so as to be partially or wholly encapsulated therein. In an embodiment, magnet 468 may be secured within housing 472 to back wall 478 using a bolt, rivet, or other type of attachment 480. In some embodiments, such as shown in the cross-sectional view of FIG. 20, magnet 468 and back wall 478 may be formed such that a hole or opening is provided in each to receive rivet 480 therethrough, for example. In an embodiment, magnet 468 may be formed such that a front end of rivet 480 is flush with (lying in generally the same plane) or recessed from its forward surface 482 when the magnet 468 is connected to housing 472 (see FIG. 20). Alternatively, magnet 468 may be secured to side walls 476a and 476b of housing 472. It is also envisioned that other attachment devices (e.g., adhesive) may be used to secure magnet 468 within housing 472.

Similar to the embodiment described with respect to FIGS. 11 and 12, for example, when the magnet assembly 400 is secured to a blade or an end hook (such as blade 16 or end hook member 34), forward surface 482 of magnet 468 can be removably fixed at a position that is aligned with (lying in generally the same plane) or slightly recessed from a forward surface 161 of the hook portion 152 with the end hook member 34 in its retracted position.

Also shown in FIGS. 16-20 is mounting portion 470 of magnet assembly 466 which extends laterally from housing 472. Mounting portion 470 may be attached to one or more walls of housing 472 in any number of ways and should not be limiting. In an embodiment, mounting portion 470 may be attached to housing 472 using side walls 476a and 476b and/or attachment portion 484. For example, side walls 476a and 476b and attachment portion 484 may be configured to attach to mounting portion 470. In another embodiment, mounting portion 470 may be integrally formed with housing 472. In an embodiment, at least attachment portion 484 may be formed with one or more structures or openings 486 configured to align with one or more lock areas or openings 494 of the mounting portion 470 when housing 472 is attached thereto, such that the one or more lock areas 494 of mounting portion 470 are accessible and unobstructed for use.

Mounting portion 470 is configured to removably fix the magnet assembly 466 relative to an elongated blade, such as elongated blade 16. For example, in the illustrated embodiment of FIGS. 16-20, mounting portion 470 of magnet assembly 466 comprises spaced leg sections 488 and 490 configured to at least partially surround one or more of attachment rivets (such as rivets 169 of FIGS. 7, 7A, and 7B) used to attach end hook member 34 to elongated blade 16. Spaced leg sections 488 and 490 may comprise a slot 492 therebetween. Slot 492 has lock areas 494 or openings. The number of lock areas 494 or openings should not be limited. In an embodiment, the number and/or position of lock areas 494 may correspond to the number and/or position of attachment rivets 169. In another embodiment, less or more lock areas 494 than the attachment rivets 169 may be provided in the slot 492. In an embodiment, each lock area 494 or opening comprises a shape complimentary to a shape of one or more of the attachment rivets 169. For example, lock areas 494 may be formed such that upper or intermediate portion 168 of rivets may be positioned therein, with a portion of legs 488, 490 trapped between the top surface of end hook mounting portion 150 and the under surface of the top portion (or head) 170 of rivets 169. Alternatively, in other embodiments, lock areas 494 may be formed to have shaft portions 166 positioned therein. Lock areas 494 may at least partially surround one or more rivets 169 when magnet assembly 466 is removably fixed to elongated blade 16. For example, lock areas 494 may comprise a substantially round or circular shape so as to surround at least a portion of a body (e.g., intermediate portion 168) of one or more of attachment rivets 169. In an embodiment, spaced leg sections 488 and 480 are resilient members. For example, spaced leg sections 488 and 490 may be configured to flex slightly with respect to one or more rivets 169 during attachment (or removal) of magnet assembly 466 to elongated blade 16.

For example, as shown by the arrows in FIG. 18, when magnet assembly 466 is removably attached to attachment rivets 169 of blade 16 by moving or sliding mounting portion 470 in at least a longitudinal direction with respect to blade 16, spaced leg sections 488 and 490 may flex outwardly during attachment and may be resiliently biased so as to surround a body or intermediate portion 168 of one or more of attachment rivets 169 after magnet assembly 466 is attached to the blade 16. The spaced leg sections 488 and 490 may be configured to surround one or more of the rivets 169 at a position above and adjacent to the end hook member 34, for example. A top portion 170 of each of the rivets 169 may be positioned above the spaced leg sections 488 and 490. As shown in the illustrated embodiment, a front lock area 494 may comprise a slot that is configured to frictionally fit around a forwardly positioned attachment rivet 169, and also or alternatively provide a shape locking type connection. A back lock area 494 may comprise a complimentary substantially round or circular shape that surrounds at least a part of attachment rivet 169.

The spaced leg sections 488 and 490 may be made from any number of materials. For example, in an embodiment, the spaced leg sections 488 and 490 comprise spring steel material. In accordance with another embodiment, other resilient materials may also be used. Moreover, in an embodiment, the material used to form the spaced leg sections 488 and 490 is not resilient.

Figure 21:
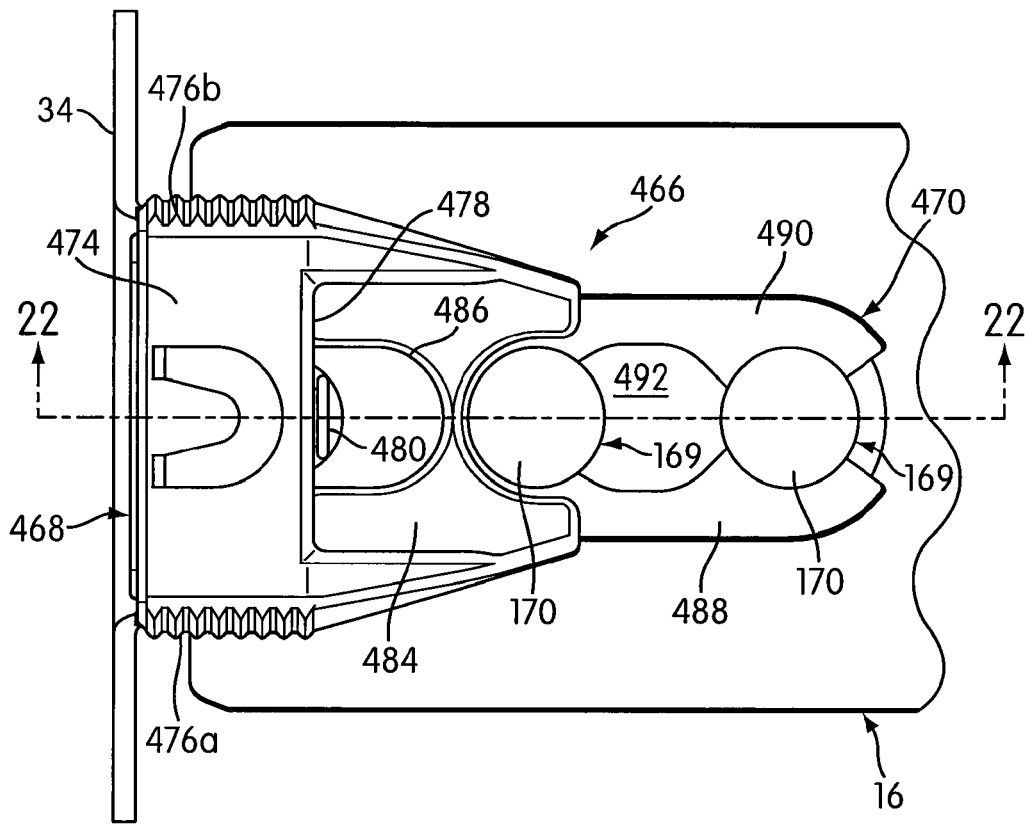
FIG. 21 shows a top view of the end hook member and magnet mechanism of FIG. 16 on an end hook member of a rule assembly in a first (extended) position in accordance with an embodiment of the present disclosure.
Figure 22:
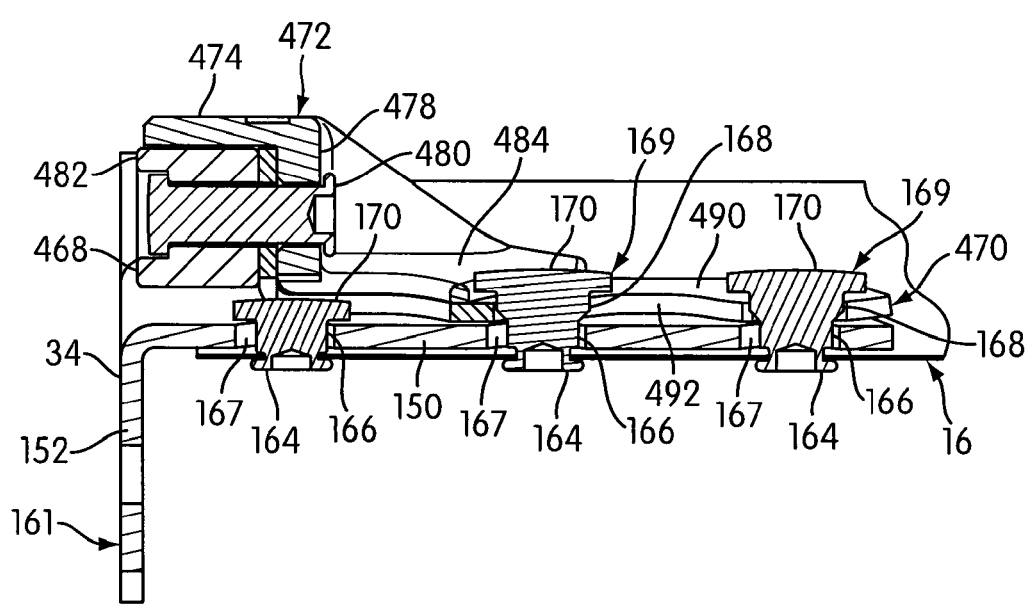
FIG. 22 shows a cross-sectional view taken through the line 22-22 in FIG. 21 of the end hook member and magnet mechanism with the end hook member in the extended position.

FIGS. 21 and 22 illustrate a top view and a cross-sectional view, respectively, of an end of the elongated blade 16 with magnet assembly 466 removably attached to attachment rivets 169 and adjacent end hook member 34. The end hook member 34 is in an extended position (such as shown in FIG. 7A). When the end hook member 34 is in its extended position, forward surface 482 of the magnet 468 is removably fixed at a position that is at least slightly recessed from forward surface 161 of the hook portion 152.

Figure 23:
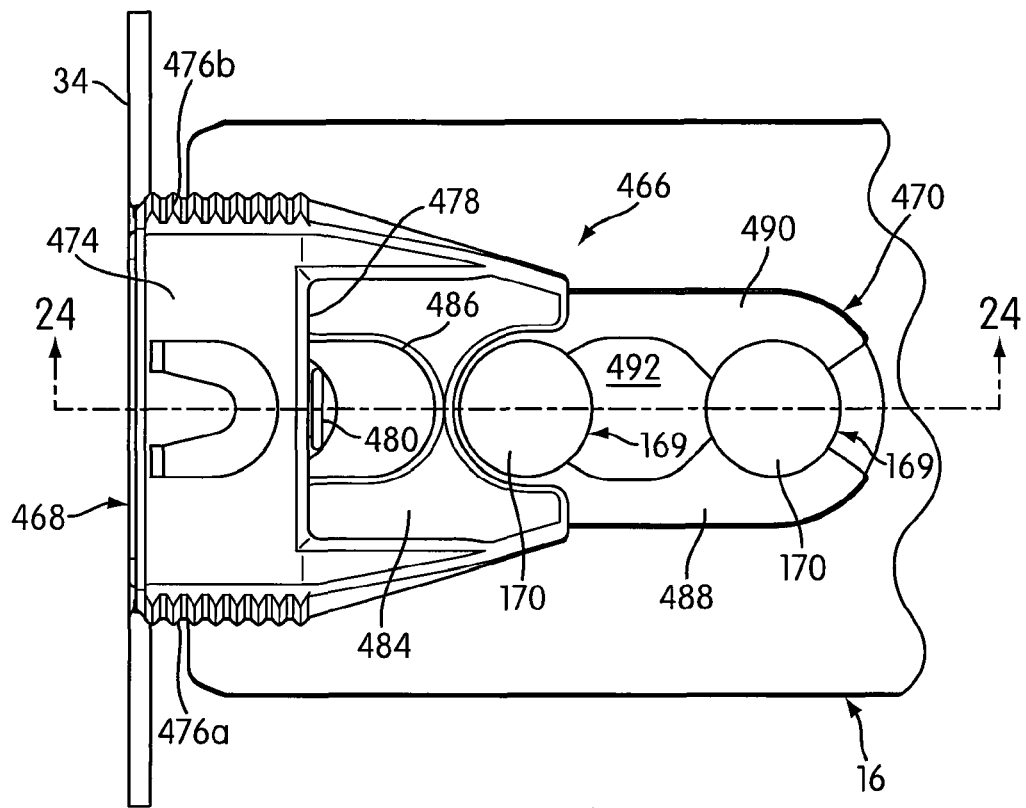
FIG. 23 shows a top view of the end hook member and magnet mechanism of FIG. 16 on the end hook member in a second (retracted) position in accordance with an embodiment of the present disclosure.
Figure 24:
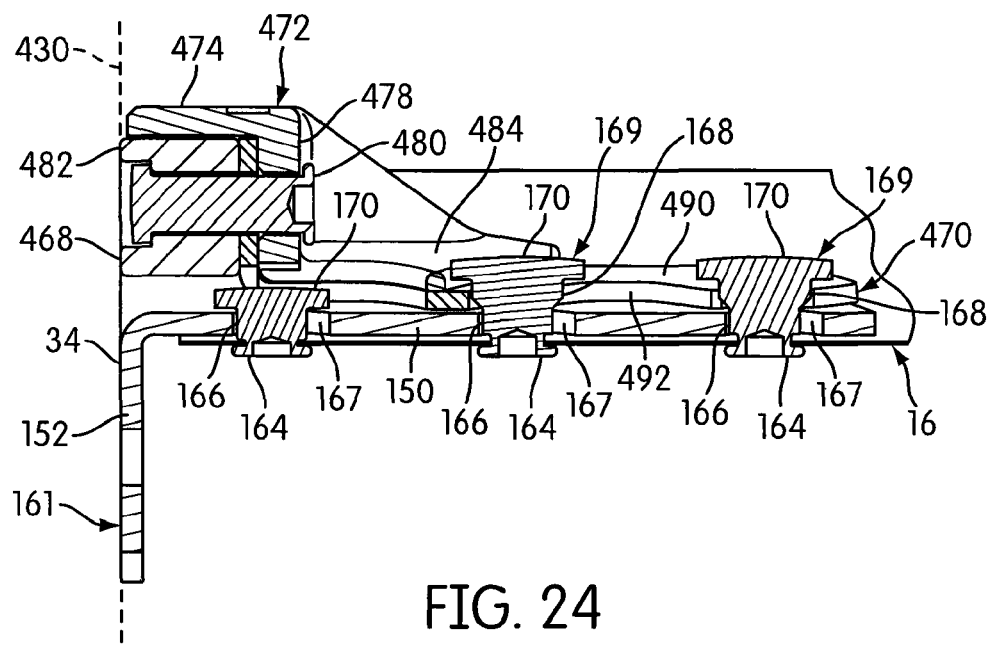
FIG. 24 shows cross-sectional view taken through the line 24-24 in FIG. 23 of the end hook member and magnet mechanism with the end hook member in a retracted of position.

As previously described, in accordance with an embodiment, end hook member 34 is capable of limited movement relative to the blade 16 between an extended position (see FIG. 7A) and a retracted position (see FIG. 7B). FIGS. 23 and 24 illustrate a top view and a cross-sectional view, respectively, of the end hook member 34 of the elongated blade 16 in a retracted position (e.g., in contact with an object or surface) with magnet assembly 466 removably attached thereto. The removably attachable magnet assembly 466, when attached to attachment rivets 169, is configured to remain fixed relative to the blade 16 when the end hook member 34 is moved. When the end hook member 34 is moved to its retracted position, forward surface 482 of the magnet 468 is removably fixed at a position that is aligned with or slightly recessed from forward surface 161 of the hook portion 152. The end hook member 34 retains this ability to slide relative to the blade 16 when the magnet assembly 466 is attached.

In other embodiments, the forward surface 482 of the magnet is slightly recessed from the forward surface 161 when hook portion 152 is retracted, but sufficiently close to magnetically adhere to a magnetic metal object.

When the removably attachable magnet assembly 466 is not desired to be used, it can be removed. Specifically, the magnet assembly 466 may be moved in a lateral direction and/or upward direction relative to the blade 16. When the magnet assembly is moved away from rivets 169 (e.g., in an opposite direction as shown by the arrows of FIG. 18), one or both of the spaced leg sections 488 and/or 490 may be slightly biased outwardly from one or more rivets 169. The movement in the lateral direction releases front attachment rivet 169 from its friction fit with front lock area 494 and into slot 492. A back attachment rivet 169 is unlatched from back lock area 494 and out of position from spaced leg sections 488 and 490. The magnet assembly 466 may then be moved or lifted from the elongated blade 16.

In some embodiments, when the magnet assembly 466 is attached in place, the forward surface of the magnet (i.e., forward surface 482 of magnet 468) is positioned at a theoretical zero point of the tape rule assembly 10 (e.g., plane 430 at the outside or forward surface 161 of the hook portion 152 when the end hook member 34 is in a retracted position, shown in FIG. 24, or plane at inner surface 163 of the hook portion 152 when end hook member 34 is in an extended position). The theoretical zero point is not necessarily in exact alignment with the zero mark on the elongated blade 16.

In some embodiments, the forward surface of the magnet may be recessed from the plane defined by the forward surface of the hook portion (i.e., of the theoretical zero point). In such an embodiment, the magnet housing itself may be in alignment with or slightly recessed from the plane defined by the theoretical zero point (which is a plane defined by the forward or rearward (inner) surface of the vertical hook portion, depending if the hook is retracted or extended). That is, the magnet may be recessed within the magnet housing such that the forward surface of the magnet is not in alignment with the forward surface of the hook portion, but slightly recessed or behind that plane. In such instances, the magnet will not directly impact an object it is positioned adjacent to. This can reduce damage to the magnet itself allowing the magnet housing to absorb any impact with the object.

In accordance with another embodiment, a layer of cushioning material may be provided in front of the magnet in the magnet housing. For example, a shock absorbing, elastic, elastomeric, plastic, felt, or other material may be placed in front of the magnet to absorb impact with an object and reduce and/or prevent the magnet from directly contacting or hitting the object when it is attracted to the object surface.

In one embodiment, a forward surface of the magnet is removably fixed at a position that is aligned with the forward surface of the hook portion with the end hook member in its retracted position. In another embodiment, a forward surface of the magnet is removably fixed at a position that is approximately aligned with the forward surface of the hook portion with the end hook member in its retracted position, and in particular, the forward surface of the magnet may be fixed at a position that is slightly forward of the forward surface of the hook portion with the end hook member in its retracted position or slightly recessed of the forward surface of the hook portion with the end hook member in its retracted position. In the embodiment with the forward surface of the magnet is slightly recessed from the forward surface of the hook portion with the end hook member in its retracted position, the magnet is sufficiently close to a metal (magnetic) work surface to be measured and that is contacting the forward surface of the hook portion, so as to achieve the desired magnetic attraction functionality.

In accordance with yet another embodiment, the forward surface of the magnet can protrude slightly forward relative to (a plane defined by) the forward surface 161 of the hook portion 152.

The type of magnet used in any of the disclosed magnet assemblies and its features are not intending to be limiting. In various embodiments, the magnet in the magnet housing is a rare earth magnet (e.g., neodymium based magnet). In some embodiments, the magnet 468 has sufficiently high Gauss level in relation to the weight of all of the components of the tape rule assembly 10, such that the entire tape rule assembly can be self-supportedly attached to a ferrous metallic object. In one example, with the blade 16 locked within the housing 12, the magnet 468 can be adhered to an overhead, horizontally disposed metallic material, and the magnetic attraction can be sufficiently strong to adhere to the entire tape measure assembly 10 (include its entire own weight) to the surface. For example, in an embodiment, the magnet may provide a minimum holding force of 1.4 ft-lbs. It should be appreciated, however, the lesser strength magnets can also be used.

Additionally, the materials and methods for manufacturing the magnet housing should not be limiting. As previously noted, the magnet housing may be formed from plastic material. The magnet housing may be injection molded, for example. In an embodiment, the housing is made from one or more relatively non-ferrous material(s). By using relatively non-ferrous materials, the magnet may not transfer its magnetism to the magnet housing (e.g., to the mounting portion or surrounding walls). This reduces the attraction of debris to the end of the tape rule. Also, it focuses the magnetic force of the magnet in a specific direction, which reduces or prevents inadvertent use of a backside of the magnet housing when taking measurements.

If so desired, a user may remove the magnet assembly from the elongated blade 16. For example, a user may desire to use a magnet assembly when an end of the elongated blade is placed with/against ferrous material(s), but can remove the magnet assembly when the blade is placed with/against non-ferrous material(s).

The aspects described above of the end hook including the magnet mechanism should not be limited to the illustrated exemplary embodiments. For example, although the illustrated embodiments show exemplary devices for at least temporarily attaching a magnet to an elongated blade, the construction of such devices should not be limiting. For example, in accordance with an embodiment, the magnet assembly, when attached to the tape rule structure 10, may enable attachment of an additional complimentary utility device. For example, in an embodiment, a scribing implement, tool, or instrument may be attached to the magnet assembly and/or blade. In another embodiment, a cutting blade, instrument, or tool may be attached to the magnet assembly and/or blade. In yet another embodiment, an additional device for positional securement of the magnet assembly relative to the elongated blade may be added.

Also, in some embodiments, such as the exemplary magnet mechanism 400, the magnetic mechanism allows an operator to negate use of a magnet when so desired (i.e., the magnet mechanism may be moved to a second, retracted position such that the magnet is not operative when taking measurements). By moving the magnet mechanism to a second, retracted position and out of operation, the amount of ferrous particles build-up on a magnetic face of the magnet (e.g., front surface 420 of magnet 402) is limited and/or prevented, which can also, therefore, increase accuracy of measurements.

One skilled in the art will understand that the embodiment of the rule assembly 10 shown in the figures and described above is exemplary only and not intended to be limiting. It is within the scope of the disclosure to provide any known rule assembly with any or all of the features of the present disclosure. For example, the end hook constructed according to the principles of the present disclosure can be applied to any known rule assembly. It is also within the scope of the disclosure that the removably attachable magnet mechanism/assembly can be used with any measuring device; for example, long tape measures.

Additionally, the manner of connecting the magnet mechanism/assembly described herein is only an example and is not intended to be limiting. Other types of connections (e.g., not through rivets) can be utilized.

The term "blade" as used herein should be construed as a generic term to cover metal blades as well as non-metal blades (e.g., made of plastic, fabric, elastomer, and/or other materials or combinations thereof).

Although the disclosure has been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. In addition, it is to be understood that the present disclosure contemplates that, to the extent possible, one or more features of any embodiment can be combined with one or more features of any other embodiment.

What is claimed is:

1. A rule assembly comprising:
    a housing;
    a reel rotatably mounted in the housing;
    an elongated blade arranged to be wound on the reel and to be extendable through an opening in the housing;
    an end hook member having a mounting portion and a hook portion, the mounting portion of the end hook member attached to the elongated blade, the hook portion having a forward surface and a rearward surface, the end hook member capable of limited movement relative to the blade between an extended position and a retracted position; and
    a removably attachable magnet assembly comprising an assembly mounting portion and a magnet, the assembly mounting portion configured to removably fix the magnet assembly relative to the elongated blade such that a forward surface of the magnet is removably fixed at a position that is aligned with or approximately aligned with the forward surface of the hook portion with the end hook member in its retracted position.

2. The rule assembly according to claim 1, wherein the assembly mounting portion is configured to removably fix the magnet assembly such that the forward surface of the magnet is aligned with the forward surface of the hook portion with the end hook member in its retracted position.

3. The rule assembly according to claim 1, wherein the forward surface of the magnet is removably fixed at a position that is slightly recessed from the forward surface of the hook portion with the end hook member in its retracted position.

4. The rule assembly according to claim 1, wherein the forward surface of the magnet is removably fixed at a position that is slightly forward of the forward surface of the hook portion with the end hook member in its retracted position.

5. The rule assembly according to claim 1, wherein the magnet assembly is attachable to the elongated blade via rivets on the blade that mount the mounting portion of the end hook member to the elongated blade.

6. The rule assembly according to claim 1, wherein the magnet of the magnet assembly is spaced from the end hook member when the magnet assembly is attached to the elongated blade.

7. The rule assembly according to claim 1, wherein the end hook member is attached to the elongated blade using one or more rivets.

8. The rule assembly according to claim 7, wherein the magnet assembly is removably attached to the one or more rivets.

9. The rule assembly according to claim 7, wherein the assembly mounting portion of the magnet assembly comprises spaced leg sections configured to at least partially surround one or more rivets.

10. The rule assembly according to claim 9, wherein the spaced leg sections comprise a slot therebetween, the slot having lock areas, each lock area comprising a shape complimentary to a shape of one or more rivets, and wherein the lock areas at least partially surround one or more rivets when the magnet assembly is removably fixed to the elongated blade.

11. The rule assembly according to claim 9, wherein the spaced leg sections are resilient members.

12. The rule assembly according to claim 11, wherein the spaced leg sections comprise spring steel material.

13. The rule assembly according to claim 1, wherein the magnet assembly further comprises a resilient member that biases the magnet in a forward direction such that the forward surface of the magnet is removably fixed at the position that is aligned with or slightly recessed from the forward surface of the hook portion with the end hook member in its retracted position.

14. The rule assembly according to claim 13, wherein the resilient member is a coil spring.

15. A blade and hook assembly comprising:
    an elongated blade;
    a reel rotatably mounted in the housing;
    an end hook member having a mounting portion and a hook portion, the mounting portion of the end hook member attached to the elongated blade, the hook portion having a forward surface and a rearward surface, the end hook member capable of limited movement relative to the blade between an extended position and a retracted position; and
    a removably attachable magnet assembly comprising an assembly mounting portion and a magnet, the assembly mounting portion configured to removably fix the magnet assembly relative to the elongated blade such that a forward surface of the magnet is removably fixed at a position that is aligned with or approximately aligned with the forward surface of the hook portion with the end hook member in its retracted position.

16. The blade and hook assembly according to claim 15, wherein the assembly mounting portion is configured to removably fix the magnet assembly such that the forward surface of the magnet is aligned with the forward surface of the hook portion with the end hook member in its retracted position.

17. The blade and hook assembly according to claim 15, wherein the forward surface of the magnet is removably fixed at a position that is slightly recessed from the forward surface of the hook portion with the end hook member in its retracted position.

18. The blade and hook assembly according to claim 15, wherein the forward surface of the magnet is removably fixed at a position that is slightly forward of the forward surface of the hook portion with the end hook member in its retracted position.

19. The blade and hook assembly according to claim 15, wherein the magnet assembly is attachable to the elongated blade via rivets on the blade that mount the mounting portion of the end hook member to the elongated blade.

20. The blade and hook assembly according to claim 15, wherein the magnet of the magnet assembly is spaced from the end hook member when the magnet assembly is attached to the elongated blade.

21. The blade and hook assembly according to claim 15, wherein the end hook member is attached to the elongated blade using one or more rivets.

22. The blade and hook assembly according to claim 21, wherein the magnet assembly is removably attached to the one or more rivets.

23. The blade and hook assembly according to claim 21, wherein the assembly mounting portion of the magnet assembly comprises spaced leg sections configured to at least partially surround one or more rivets.

24. The blade and hook assembly according to claim 23, wherein the spaced leg sections comprise a slot therebetween, the slot having lock areas, each lock area comprising a shape complimentary to a shape of one or more rivets, and wherein the lock areas at least partially surround one or more rivets when the magnet assembly is removably fixed to the elongated blade.

25. The blade and hook assembly according to claim 23, wherein the spaced leg sections are resilient members.

26. The blade and hook assembly according to claim 25, wherein the spaced leg sections comprise spring steel material.

27. The blade and hook assembly according to claim 15, wherein the magnet assembly further comprises a resilient member that biases the magnet in a forward direction such that the forward surface of the magnet is removably fixed at the position that is substantially aligned with or slightly recessed from the forward surface of the hook portion with the end hook member in its retracted position.

28. The rule assembly according to claim 27, wherein the resilient member is a coil spring.

* * * * *